United States Patent
Maruo et al.

(10) Patent No.: US 10,090,539 B2
(45) Date of Patent: Oct. 2, 2018

(54) FUEL CELL SYSTEM

(71) Applicant: TOYOTA JIDOSHA KABUSHIKI KAISHA, Toyota-shi, Aichi-ken (JP)

(72) Inventors: Tsuyoshi Maruo, Toyohashi (JP); Takashi Yamada, Hekinan (JP); Hiroyuki Imanishi, Toyota (JP); Mitsuhiro Nada, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/185,527

(22) Filed: Jun. 17, 2016

(65) Prior Publication Data

US 2016/0380282 A1    Dec. 29, 2016

(30) Foreign Application Priority Data

Jun. 26, 2015   (JP) ................................. 2015-128288

(51) Int. Cl.
*H01M 8/04119* (2016.01)
*H01M 8/0432* (2016.01)
(Continued)

(52) U.S. Cl.
CPC ..... *H01M 8/04179* (2013.01); *B60L 11/1883* (2013.01); *B60L 11/1885* (2013.01); *B60L 11/1892* (2013.01); *H01M 8/0432* (2013.01); *H01M 8/04067* (2013.01); *H01M 8/04228* (2016.02); *H01M 8/04231* (2013.01);
(Continued)

(58) Field of Classification Search
CPC ......... H01M 2250/20; H01M 8/04067; H01M 8/04179; H01M 8/04228; H01M 8/04231; H01M 8/0432; H01M 8/04664; H01M 8/04723; H01M 8/04753; B60L 11/1883;
(Continued)

(56) References Cited

U.S. PATENT DOCUMENTS

2007/0092771 A1*  4/2007  Wake ................ H01M 8/04179
                                                                 429/414
2007/0298289 A1   12/2007  Clingerman et al.
(Continued)

FOREIGN PATENT DOCUMENTS

DE    11 2007 002 603 T5   12/2009
DE    11 2008 002 747 T5    8/2010
(Continued)

*Primary Examiner* — Carlos Barcena
(74) *Attorney, Agent, or Firm* — Finnegan, Henderson, Farabow, Garrett & Dunner, LLP (57) ABSTRACT

An object is to perform a purge at an appropriate timing. There is provided a fuel cell system mounted on a vehicle. The fuel cell system comprises a gas supplier that is configured to supply a purge gas into a fuel cell; and a controller that is configured to control the gas supplier and perform a purge with the purge as at a stop time of the vehicle. The controller obtains an ambient temperature in a driving state of the vehicle a plurality of times. In a case where an ambient temperature obtained last time among the ambient temperatures obtained in the driving state is lower than a predetermined reference value, the controller performs the purge with enhancing a purging capacity, compared with a case where the ambient temperature obtained last time is higher than the predetermined reference value.

11 Claims, 4 Drawing Sheets

(51) Int. Cl.
*H01M 8/04223* (2016.01)
*H01M 8/04007* (2016.01)
*H01M 8/04701* (2016.01)
*B60L 11/18* (2006.01)
*H01M 8/04664* (2016.01)
*H01M 8/04746* (2016.01)
*H01M 8/04228* (2016.01)

(52) U.S. Cl.
CPC ... *H01M 8/04664* (2013.01); *H01M 8/04723* (2013.01); *H01M 8/04753* (2013.01); *H01M 2250/20* (2013.01); *Y02T 90/32* (2013.01)

(58) Field of Classification Search
CPC ... B60L 11/1885; B60L 11/1892; Y02T 90/32
See application file for complete search history.

(56) References Cited

U.S. PATENT DOCUMENTS

| | | |
|---|---|---|
| 2010/0255396 A1 | 10/2010 | Kajiwara et al. |
| 2010/0323261 A1 | 12/2010 | Igarashi et al. |
| 2011/0003215 A1* | 1/2011 | Tanaka .............. H01M 8/04156 429/413 |
| 2012/0183875 A1 | 7/2012 | Yumita |
| 2014/0093801 A1* | 4/2014 | Rogahn ............. H01M 8/04231 429/429 |
| 2016/0133963 A1 | 5/2016 | Naganuma et al. |
| 2016/0141671 A1 | 5/2016 | Ogawa et al. |

FOREIGN PATENT DOCUMENTS

| | | |
|---|---|---|
| DE | 10 2013 108 197 A1 | 4/2014 |
| DE | 10 2015 117 485 A1 | 5/2016 |
| DE | 10 2015 119 018 A1 | 5/2016 |
| JP | 2006-79864 | 3/2006 |
| JP | 2008-10424 | 1/2008 |
| JP | 2008-103156 A | 5/2008 |
| JP | 2009-199940 A | 9/2009 |
| JP | 2011-204447 | 10/2011 |
| JP | 2013-171810 A | 9/2013 |
| WO | WO 2011/010365 A1 | 1/2011 |

* cited by examiner

FUEL CELL SYSTEM

CROSS-REFERENCE TO RELATED APPLICATIONS

The present application claims priority from Japanese patent application JP2015-128288 filed on Jun. 26, 2015, the content of which is hereby incorporated by reference into this application.

BACKGROUND

Field

The present invention, relates to a fuel cell system mounted on a vehicle.

Related Art

When a fuel cell system mounted on a vehicle is used in a subzero environment, water remaining inside of a fuel cell or its connection pipes is likely to be frozen and cause deterioration of the startability. A proposed fuel cell system described in JP 2011-204447A estimates a freezing time based on outside air conditions including an ambient temperature at a stop time of the fuel cell system and performs a purge operation to purge inside of a fuel cell after elapse of the freezing time, so as to reduce the amount of water remaining inside of the fuel cell and prevent freezing.

A fuel cell vehicle is likely to be affected by a disturbance in some parking place and detect a higher temperature as ambient temperature than the actual temperature. The fuel cell system described in JP 2011-204447A is likely to estimate the freezing time based on the detected ambient temperature that is higher than the actual temperature at the stop time of the fuel cell system. This may result in a failure to perform a purge at an appropriate timing prior to the occurrence of freezing. This may also result in a failure to perform a desired purge operation with an appropriate purging capacity to prevent freezing. This leads to the low purging effect.

SUMMARY

In order to solve at least part of the above problems, the invention may be implemented by any of the following aspects.

According to one aspect of the invention, there is provided a fuel cell system mounted on a vehicle. This fuel cell system comprises: a fuel cell; an ambient temperature sensor configured to obtain a temperature outside of the vehicle as an ambient temperature; a gas supplier configured to supply a purge gas into the fuel cell; and a controller configured to control the gas supplier and perform a purge operation to purge the fuel cell with the purge gas. The controller obtains an ambient temperature in time series from the ambient temperature sensor in a driving state of the vehicle where the vehicle has a non-zero vehicle speed. The controller performs the purge operation after an off operation of a start switch of the vehicle. In a case where an ambient temperature obtained last time among the ambient temperatures obtained in time series is lower than a predetermined reference value, the controller performs the purge operation after the off operation of the start switch with enhancing a purging capacity, compared with a case where the ambient temperature obtained last time is higher than the predetermined reference value.

(2) In the fuel cell system of the above aspect, the enhancing the purging capacity may comprise increasing a purge time.
(3) In the fuel cell system of the above aspect, the enhancing the purging capacity may comprise increasing a power of purging per unit time.
(4) According to another aspect of the invention, there is provided a fuel cell system mounted on a vehicle. This fuel cell system comprises: a fuel cell; an ambient temperature sensor configured to obtain a temperature outside of the vehicle as an ambient temperature; a gas supplier configured to supply a purge gas into the fuel cell; and a controller configured to control the gas supplier and perform a purge operation to purge the fuel cell with the purge gas. The controller obtains an ambient temperature in time series from the ambient temperature sensor in a driving state of the vehicle where the vehicle has a non-zero vehicle speed. The controller performs the purge operation after an off operation of a start switch of the vehicle. In a case where an ambient temperature obtained last time among the ambient temperatures obtained in time series is lower than a predetermined reference value, the controller increases likelihood of performing the purge operation after the off operation of the start switch, compared with a case where the ambient temperature obtained last time is higher than the predetermined reference value.
(5) In the fuel cell system of the above aspect, the controller may obtain an ambient temperature from the ambient temperature sensor in a non-driving state of the vehicle where the vehicle has a zero vehicle speed. The controller may set a timing when the purge operation is performed, based on a lower temperature between the ambient temperature obtained in the driving state and the ambient temperature obtained in the non-driving state.
(6) In the fuel cell system of the above aspect, when the ambient temperature sensor is abnormal, the controller may perform the purge with a condition that is similar to a condition in the case where the ambient temperature obtained in the driving state is lower than the predetermined reference value.
(7) In the fuel cell system of the above aspect, the controller reduces a water content of the fuel cell in the case where the ambient temperature obtained in the driving state is lower than the predetermined reference value, compared with the case where the ambient temperature obtained in the driving state is higher than the predetermined reference value.
(8) The reducing the water content of the fuel cell comprises increasing a temperature of cooling medium for the fuel cell or increasing a supply amount of an oxidizing gas that is to be supplied to the fuel cell.

The invention may also be implemented by any of the following aspects.
(9) According to a first aspect of the invention, there is provided a fuel cell system mounted on a vehicle. This fuel cell system comprises a gas supplier that is configured to supply a purge gas into a fuel cell; and a purge controller that is configured to control the gas supplier and perform a purge with the purge gas at a stop time of the vehicle. The purge controller obtains an ambient temperature in a driving state of the vehicle a plurality of times. In a case where an ambient temperature obtained last time among the ambient temperatures obtained in the driving state is equal to or lower than a predetermined reference value, the purge controller performs the purge with enhancing a purging capacity, compared with a case where the ambient temperature obtained last time is higher than the predetermined reference value. The fuel cell system of the first aspect causes a purge to be performed using the ambient temperature in the driving state of the vehicle. The inventors of the present invention have found that the ambient temperature in the driving state of the vehicle is less affected by a disturbance than the ambient temperature at the stop time of the vehicle. The fuel cell system of the first aspect can thus perform the purge with enhancing the purge capacity based on the ambient temperature that is insusceptible to a disturbance. This accordingly enhances the purging effect.

(10) In the fuel cell system of the first aspect, the enhancing the purging capacity may comprise increasing a purge time. The fuel cell system of this aspect is allowed to decrease the capacity required for a pump to enhance the purging effect, compared with a configuration that increases the displacement of a pump to enhance the purging effect.

(11) In the fuel cell system of the first aspect, the enhancing the purging capacity may comprise increasing a power of purging per unit time. The fuel cell system of this aspect allows the purge operation to be completed in a short time period.

(12) According to a second aspect of the invention, there is provided a fuel cell system mounted on a vehicle. This fuel cell system comprises a gas supplier that is configured to supply a purge gas into a fuel cell; and a purge controller that is configured to control the gas supplier and perform a purge with the purge gas at a predetermined timing after a stop of the vehicle. The purge controller obtains an ambient temperature in a driving state of the vehicle a plurality of times. In a case where an ambient temperature obtained last time among the ambient temperatures obtained in the driving state is equal to or lower than a predetermined reference value, the purge controller increases likelihood of performing the purge, compared with a case where the ambient temperature obtained last time is higher than the predetermined reference value. The fuel cell system of the second aspect increases the likelihood of performing the purge using the ambient temperature in the driving state of the vehicle. As described above, the ambient temperature in the driving state of the vehicle is less affected by a disturbance than the ambient temperature at the stop time of the vehicle. The fuel cell system of the second aspect increases the likelihood of performing the purge based on the ambient temperature insusceptible to a disturbance. This enables the purge to be performed at an appropriate timing.

(13) The fuel cell system of the second aspect may further comprise a non-driving state ambient temperature acquirer that is configured to obtain an ambient temperature in a non-driving state of the vehicle. The purge controller may set the predetermined timing, based on a lower temperature between the ambient temperature obtained in the driving state and the ambient temperature obtained in the non-driving state. The ambient temperature in the driving state of the vehicle is less affected by a disturbance than the ambient temperature at the stop time of the vehicle, while being likely to be detected as a higher temperature than the ambient temperature detected at the stop time of the vehicle, depending on the time of day. The fuel cell system of this aspect, however, determines the timing when the purge is to be performed after a stop of the vehicle, based on the lower temperature between the ambient temperature in the driving state and the ambient temperature in the non-driving state. This enables the purge to be performed at the more appropriate timing.

(14) In the fuel cell system of the first aspect or the second aspect, when a sensor provided to detect the ambient temperature is abnormal, the purge controller may perform the purge with a condition that is similar to a condition in the case where the ambient temperature obtained in the driving state is equal to or lower than the predetermined reference value. When the sensor provided to detect the ambient temperature is abnormal, the fuel cell system of this aspect performs a purge, as a precaution, similar to the purge performed using the ambient temperature in the driving state that is insusceptible to a disturbance. This further enhances the purging effect.

(15) The fuel cell system of the first aspect or the second aspect may further comprise a water content controller that is configured to reduce a water content of the fuel cell in the case where the ambient temperature obtained in the driving state is equal to or lower than the predetermined reference value, compared with the case where the ambient temperature obtained in the driving state is higher than the predetermined reference value. The fuel cell system of this aspect reduces the water content of the fuel cell in advance and thereby further reduces the amount of water remaining in the fuel cell system after the purge.

(16) In the fuel cell system of the first aspect or the second aspect, the reducing the water content of the fuel cell may comprise increasing a water temperature of the fuel cell or increasing a supply amount of an oxidizing gas that is to be supplied to the fuel cell. The fuel cell system of this aspect increases the removal amount of water from the fuel cell and thereby readily reduces the water content of the fuel cell.

The invention may be implemented by any of various aspects other than the aspects of the fuel cell system described above, for example, a vehicle equipped with the fuel cell system, a control method of the fuel cell system, a computer program configured to implement the functions corresponding to the respective processes of the control method, and a non-transitory storage medium in which the computer program is stored.

The following describes an embodiment of the invention.

DESCRIPTION OF EMBODIMENTS

The following describes an embodiment of the invention.

A. GENERAL CONFIGURATION

Figure 1:
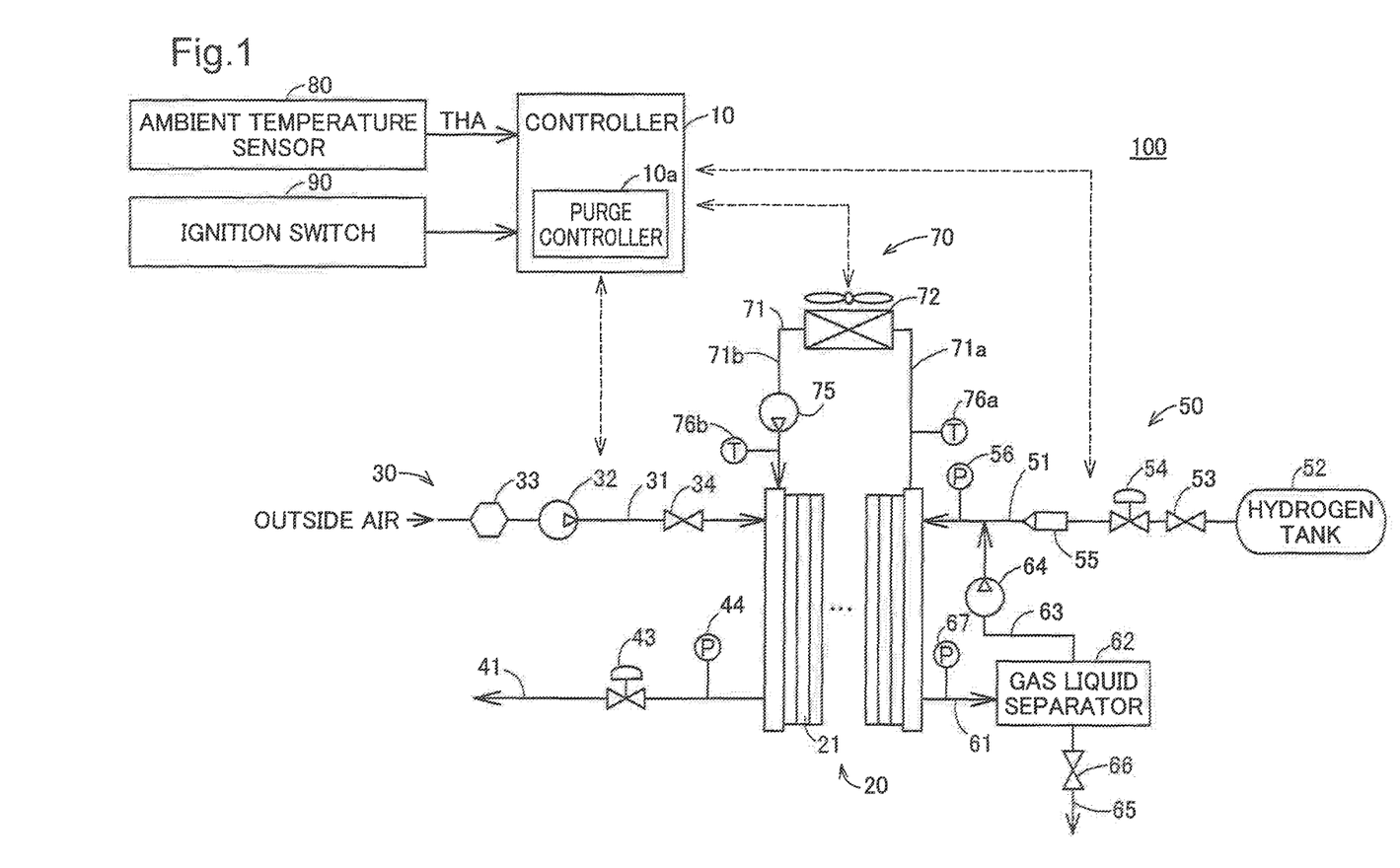
FIG. 1 is a schematic diagram illustrating the configuration of a fuel cell system according to one embodiment of the invention.

FIG. 1 is a schematic diagram illustrating the configuration of a fuel cell system 100 according to one embodiment of the invention. This fuel cell system 100 is mounted on a fuel cell vehicle and is configured to output electric power that is used as a driving force, in response to the driver's request. The fuel cell vehicle is, for example, a four-wheel vehicle. The fuel cell system 100 includes a controller 10, a fuel cell stack 20, an air supply discharge system 30, a hydrogen gas supply discharge system 50 and a cooling medium circulation system 70.

The controller 10 is configured by a microcomputer including a central processing unit (CPU) and a storage unit. The controller 10 loads and executes programs on the storage unit to provide various functions. The controller 10 serves to control the respective components of the fuel cell system 100 and perform operation control of the fuel cell stack 20 that causes the fuel cell stack 20 to generate electric power in response to an output request.

The fuel cell stack 20 is a unit provided to generate electric power by electrochemical reaction of hydrogen and oxygen and is configured by stacking a plurality of unit cells 21. Each of the unit cells 21 is a power generating unit that is capable of generating electricity alone. Each unit cell 21 includes a membrane electrode assembly that is a power generation element having electrodes (cathode and anode) placed on the respective surfaces of an electrolyte membrane, and separators that are placed across the membrane electrode assembly. The electrolyte membrane is formed from a solid polymer thin film that shows the good proton conductivity in the wet state containing water inside. The fuel cell stack 20 may be any of various types of fuel cells and is a polymer electrolyte fuel cell according to this embodiment.

The air supply discharge system 30 serves to supply the air (oxidizing gas) to the fuel cell stack 20 and discharge drained water and a cathode off-gas from the cathode side of the fuel cell stack 20 out of the fuel cell system 100. The air supply discharge system 30 includes an air supply pipe 31, an air compressor 32, an air flowmeter 33 and an on-off valve 34 on the upstream side of the fuel cell stack 20. The air supply pipe 31 is a pipe connected with a cathode-side inlet of the fuel cell stack 20. The air compressor 32 is connected with the fuel cell stack 20 via the air supply pipe 31 to compress the intake air taken in from the outside air and supply the compressed air as the oxidizing gas to the cathode side of the fuel cell stack 20.

The air flowmeter 33 is placed on the upstream side of the air compressor 32 to measure the amount of the intake air taken in by the air compressor 32 and send the measurement value to the controller 10. The controller 10 operates the air compressor 32 based on the received measurement value, so as to regulate the amount of the air that is to be supplied to the fuel cell stack 20. The on-off valve 34 is provided between the air compressor 32 and the fuel cell stack 20. The on-off valve 34 is normally closed, and is opened when the air of a predetermined pressure is supplied from the air compressor 32 to the air supply pipe 31.

The air supply discharge system 30 includes a cathode off-gas pipe 41, a pressure regulator 43 and a pressure measurement unit 44 on the downstream side of the fuel cell stack 20. The cathode off-gas pipe 41 is a pipe connected with a cathode-side outlet of the fuel cell stack 20 to discharge the drained water and the cathode off-gas out of the fuel cell system 100. The pressure regulator 43 serves to regulate the pressure of the cathode off-gas in the cathode off-gas pipe 41 (i.e., back pressure on the cathode side of the fuel cell stack 20). The pressure measurement unit 44 is provided on the upstream side of the pressure regulator 43 to measure the pressure of the cathode off-gas and send the measurement value to the controller 10. The controller 10 adjusts the opening position of the pressure regulator 43, based on the measurement value of the pressure measurement unit 44.

The hydrogen gas supply discharge system 50 serves to supply hydrogen gas to the fuel cell stack 20, discharge an anode off-gas from the fuel cell stack 20 out of the fuel cell system 100 and circulate the anode off-gas in the fuel cell system 100. The hydrogen gas supply discharge system 50 includes a hydrogen gas supply pipe 51 and a hydrogen tank 52 on the upstream side of the fuel cell stack 20. The hydrogen tank 52 is filled with high-pressure hydrogen that is to be supplied to the fuel cell stack 20. The hydrogen tank 52 is connected with an anode-side inlet of the fuel cell stack 20 via the hydrogen gas supply pipe 51.

The hydrogen gas supply pipe 51 is provided with an on-off valve 53, a regulator 54, a hydrogen supply device 55 and a pressure measurement unit 56 that are placed in this sequence from the upstream side (hydrogen tank 52-side). The controller 10 controls opening and closing of the on-off valve 53 to control the inflow of hydrogen from the hydrogen tank 52 to the upstream side of the hydrogen supply device 55. The regulator 54 is a pressure reducing valve operated to regulate the pressure of hydrogen on the upstream side of the hydrogen supply device 55. The opening position of the regulator 54 is controlled by the controller 10. The hydrogen supply device 55 is configured by, for example, an injector that is a solenoid-operated on-off valve. The pressure measurement unit 56 serves to measure the pressure of hydrogen on the downstream side of the hydrogen supply device 55 and send the measurement value to the controller 10. The controller 10 controls the driving cycle that indicates the on-off timing of the hydrogen supply deice 55, based on the measurement value of the pressure measurement unit 56, so as to regulate the amount of hydrogen that is to be supplied to the fuel cell stack 20.

The hydrogen gas supply discharge system 50 includes an anode off-gas pipe 61, a gas liquid separator 62, a hydrogen gas circulation pipe 63, a hydrogen pump 64, an anode drainage pipe 65, a drainage valve 66 and a pressure measurement unit 67 on the downstream side of the fuel cell stack 20. The anode off-gas pipe 61 is a pipe arranged to connect an anode-side outlet of the fuel cell stack 20 with the gas liquid separator 62. The anode off-gas pipe 61 is provided with the pressure measurement unit 67. The pressure measurement unit 67 serves to measure the pressure of the anode off-gas (back pressure on the anode side of the fuel cell stack 20) in the neighborhood of an outlet of a hydrogen manifold in the fuel cell stack 20 and send the measurement value to the controller 10.

The gas liquid separator 62 is connected with the hydrogen gas circulation pip 63 and the anode drainage pipe 65. The anode off-gas flowing through the anode off-gas pipe 61 into the gas liquid separator 62 is separated into a gas component and water by the gas liquid separator 62. In the gas liquid separator 62, the gas component of the anode off-gas is guided to the hydrogen gas circulation pipe 63, while the separated water is guided to the anode drainage pipe 65.

The hydrogen circulation pipe 63 is connected with the hydrogen gas supply pipe 51 on the downstream side of the hydrogen supply device 55. The hydrogen gas circulation pipe 63 is provided with the hydrogen pump 64. The hydrogen pump 64 serves as a circulation pump to feed hydrogen included in the gas component separated by the gas liquid separator 62 to the hydrogen gas supply pipe 51.

The anode drainage pipe 65 is provided with the drainage valve 66. The drainage valve 66 is opened and closed in response to commands from the controller 10. The controller 10 normally closes the drainage valve 66 and opens the drainage valve 66 at predetermined water drainage timings and at discharge timings of an inert gas included in the anode off-gas. A downstream end of the anode drainage pipe 65 is joined with the cathode off-gas pipe 41 to cause the drained water on the anode side and the anode off-gas to be mixed with the drained water on the cathode side and the cathode off-gas and discharged, although not being specifically illustrated.

The cooling medium circulation system 70 includes a cooling medium pipe 71, a radiator 72, a circulation pump 75 and two temperature measurement units 76a and 76b. The cooling medium pipe 71 is a pipe arranged to circulate a cooling medium used to cool down the fuel cell stack 20 and includes an upstream pipe 71a and a downstream pipe 71b. The upstream pipe 71a is arranged to connect an outlet of a cooling medium flow path in the fuel cell stack 20 with an inlet of the radiator 72. The downstream pipe 71b is arranged to connect an inlet of the cooling medium flow path in the fuel cell stack 20 with an outlet of the radiator 72.

The radiator 72 has a fan configured to take in the outside air and serves to cool down the cooling medium through heat exchange between the cooling medium in the cooling medium pipe 71 and the outside air. The circulation pump 75 is provided in the downstream pipe 71b and is driven in response to a command from the controller 10. The cooling medium is flowed in the cooling medium pipe 71 by the driving force of the circulation pump 75.

A first temperature measurement unit 76a is provided in the upstream pipe 71a, while a second temperature measurement unit 76b is provided in the downstream pipe 71b. The controller 10 obtains the temperatures of the cooling medium in the respective pipes 71a and 71b detected by the two temperature measurement units 76a and 76b and computes the operation temperature of the fuel cell stack 20 from the difference between the detected temperatures of the cooling medium in the respective pipes 71a and 71b). The controller 10 controls the rotation speed of the circulation pump 75 based on the computed operation temperature of the fuel cell, stack 20, so as to control the operation temperature of the fuel cell stack 20.

The fuel cell system 100 also includes a secondary battery and a DC-DC converter (not shown). The secondary battery stores electric power output from the fuel cell stack 20 and regenerative electric power and serves as an electric power supply along with the fuel cell stack 20. The DC-DC converter controls charging and discharging of the secondary battery and controls the output voltage of the fuel cell stack 20. The respective components of the fuel cell stack 100 described above may be driven by using the electric power of the secondary battery even after a stop of operation of the fuel cell stack 20.

The fuel cell system 100 further includes an ambient temperature sensor 80 that is configured to measure the outside temperature of the vehicle (ambient temperature). The ambient temperature sensor 80 is mounted to, for example, a rear side of a front bumper. The ambient temperature sensor 80 sends the measurement result as an ambient temperature THA to the controller 10. The location of mounting the ambient temperature sensor 80 is not limited to the above location but may be any location that allows for detection of the temperature outside of the fuel cell vehicle.

The vehicle includes an ignition switch 90. The ignition switch 90 is a start switch of the vehicle operated by the driver. The fuel cell system 100 mounted on the vehicle is started by turning on the ignition switch 90 and is stopped by turning off the ignition switch 90. The storage unit has a non-transitory memory that holds the storage in the storage unit of the controller 10 even after the ignition switch 90 is turned off.

As described above, each of the unit cells 21 in the fuel cell stack 20 includes the electrolyte membrane that has the good proton conductivity in the wet state. During operation of the fuel cell stack 20, it is accordingly desirable to keep the inside of the fuel cell stack 20 in the wet state. During parking of the vehicle, when a large amount of water remains inside of the fuel cell stack 20 and inside of its connection pipes, the water is likely to be frozen in a low temperature environment such as sub-zero environment. Freezing of the remaining water causes troubles such as blockage in the flow paths of the reactive gases inside of the fuel cell stack 20 and its connection pipes and leads to deterioration of the startability of the fuel cell stack 20. Freezing inside of the fuel cell stack or inside of the connection pipe is expressed as freezing the fuel cell system in the description hereof.

The fuel cell system 100 of the embodiment performs a purge operation to purge the flow paths of the reactive gases inside of the fuel cell stack 20 and its connection pipes at a vehicle stop-time and after a vehicle stop. The controller 10 includes a purge controller 10a that serves to perform the purge. The purge controller 10a is implemented by execution of various process routines shown in FIGS. 2 to 5 by the controller 10. The following describes the respective process routines in detail.

B. CONFIGURATION OF PURGE CONTROLLER

Figure 2:
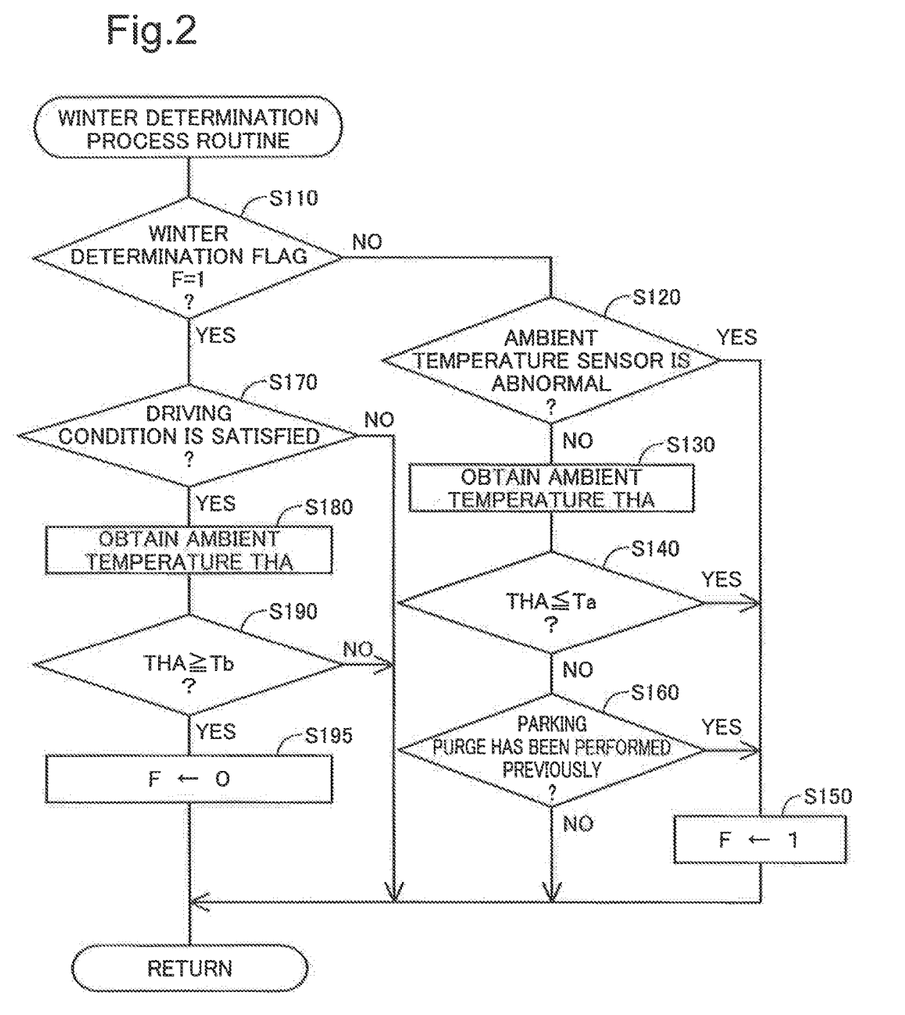
FIG. 2 is a flowchart showing a winter determination process routine performed by a controller.

FIG. 2 is a flowchart showing a winter determination process routine performed by the controller 10. The winter determination routine is repeatedly performed by the CPU of the controller 10 for a time period from an on operation to an off operation of the ignition switch 90. Consequently, the ambient temperatures are obtained in time series. The value of the winter determination flag F set in the last routine performed lastly, among the winter determination routines performed for the time period from the on operation to the off operation of the ignition switch 90, is used in the subsequent wakeup time setting routine and parking purge process routine. The value of the ambient temperature THA obtained in the last routine is also used in the subsequent makeup time setting routine and parking purge process routine. When the winter determination process routine is triggered (See FIG. 2), the CPU first determines whether a winter determination flag F is equal to value 1 (step S110). The winter determination flag F is a flag indicating whether the vehicle is in a predetermined low temperature environment. According to this embodiment, the predetermined low temperature environment is called "winter" for the purpose of convenience, and the flag indicating the predetermined low temperature environment is called winter determination flag F. The winter determination flag F is equal to value 0 as the factory setting. The winter determination flag F is stored in the non-transitory memory and is not cleared by turning of the ignition switch 90.

When it is determined at step S110 that the winter determination flag F is not equal to value 1, the CPU subsequently determines whether the ambient sensor 80 is abnormal (has a failure) (step S120). The determination of whether the ambient temperature sensor 80 is abnormal may be based on the detection result of the ambient temperature sensor 80 on satisfaction of a predetermined diagnosis condition. When it is determined at step S120 that the ambient temperature sensor 80 is not abnormal but is normal, the CPU obtains the ambient temperature THA from the ambient temperature sensor 80 (step S130) and determines whether the obtained ambient temperature THA is equal to or lower than a first reference value Ta (step S140). The first reference temperature Ta is, for example, −10° C. When it is determined that the ambient temperature THA is equal to or lower than the first reference value Ta, the CPU sets the winter determination flag F to value 1 (step S150). The first reference value Ta is not necessarily limited to −10° C. but may be any value of not higher than 0° C.

When it is determined at step S140 that the ambient temperature THA is not equal to or lower than the first reference value Ta, in other words, is higher than the first reference value Ta, on the other hand, the CPU reads soak record data from the non-transitory memory and refers to the soak record data to determine whether a parking purge has been performed previously (step S160).

The purge operation performed according to this embodiment includes: (i) a stop-time purge that is performed when the ignition switch 90 is turned off; and (ii) a parking purge that is performed when a predetermined wakeup time has elapsed since an off operation of the ignition switch 90. The stop-time purge needs some time for being performed. In this embodiment, the stop-time purge starts immediately after the ignition switch 90 is turned off and performed substantially in the time period after the ignition switch 90 is turned off. When a parking purge is performed, the fact that the parking purge is performed is recorded in the soak record data. The soak record data is cleared every time when the output voltage of the fuel cell stack 20 rises (to or above a predetermined reference value). Accordingly, the soak record data stores the result of the determination of whether a parking purge has been performed in a time period from a previous rise of the output voltage of the fuel cell stack 20 to a current rise of the output voltage of the fuel cell stack 20. It is thus determined at step S160 whether a parking purge has been performed in this time period. There is a sufficient time for the determination of step S160 between the on operation of the ignition switch 90 and the rise of the output voltage of the fuel cell stack 20.

When it is determined at step S160 that the parking purge has been performed, the CPU proceeds to step S150 to set the winter determination flag F to the value 1. More specifically when it is determined that the parking purge has been performed previously, the CPU determines that the current environment is winter and sets the winter determination flag F to the value 1. When it is determined at step S160 that the parking purge has not been performed, the CPU goes to "Return" to terminate this winter determination process routine.

When it is determined at step S120 that the ambient temperature sensor 80 is abnormal, the CPU also proceeds to step S150 to set the winter determination flag F to the value 1 and subsequently goes to "Return" to terminate this winter determination process routine.

When it is determined at step S110 that the winter determination flag F is equal to the value 1, on the other hand, the CPU subsequently determines whether a predetermined driving condition is satisfied (step S170). According to this embodiment, the predetermined driving condition is that the vehicle speed detected by a vehicle speed sensor (not shown) of not lower than a predetermined threshold value (for example, 30 [km/h]) continues for a predetermined time period (for example, 120 [s]) or longer. This driving condition is only illustrative, and the threshold value of the vehicle speed and the predetermined time period may be any other suitable values that allow for detection of the state that the vehicle is driven to some extent.

When it is determined at step S170 that the predetermined driving condition is satisfied, the CPU obtains the ambient temperature THA from the ambient temperature sensor 80 (step S180) and determines whether the obtained ambient temperature THA is equal to or higher than a second reference value Tb (step S190). The second reference value Tb is, for example, 5° C. When it is determined at step S190 that the ambient temperature THA is equal to or higher than the second reference value Tb, the CPU clears the winter determination fag F to the value 0 (step S195). More specifically, according to the processing of steps S170 to S195, when the ambient temperature THA becomes equal to or higher than 5° C. during a drive of the vehicle that satisfies the predetermined driving condition, the winter determination flag F is cleared. The second reference value Tb may be any other suitable value of not lower than 0° C.

When it is determined at step S170 that the predetermined driving condition is not satisfied or when it is determined at step S190 that the ambient temperature THA is lower than the second reference value Tb, the CPU goes to "Return" to terminate this winter determination process routine without clearing the winter determination flag F.

Figure 3:
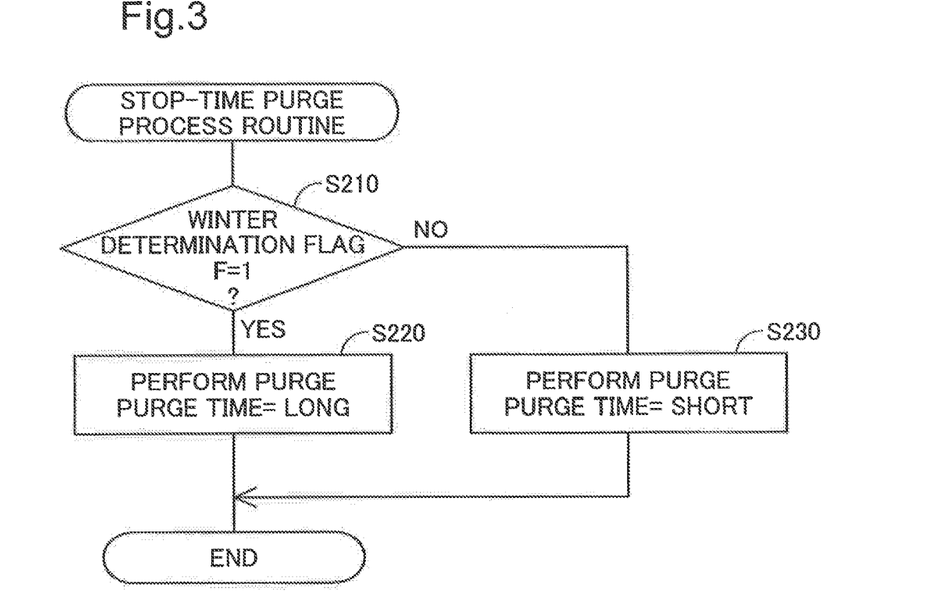
FIG. 3 is a flowchart showing a stop-time purge process routine performed by the controller.

FIG. 3 is a flowchart showing a stop-time purge process routine performed by the controller 10. The stop-time purge process routine is performed by the CPU of the controller 10 when the ignition switch 90 is turned off. When the stop-time purge process routine is triggered, the CPU first determines whether the winter determination flag F set by the winter determination process routine is equal to the value 1 (step S210). When it is determined that the winter determination flag F is equal to the value 1, the CPU proceeds to step S220 to perform a purge as described below.

The CPU operates the hydrogen pump 64 of the hydrogen gas supply discharge system 50 (shown in FIG. 1) to circulate a hydrogen-containing gas remaining in the fuel cell stack 20 as the purge gas. The CPU opens the drainage valve 66 at a predetermined timing to drain liquid water separated by the gas liquid separator 62. Performing the purge operation of circulating the anode-side gas in the fuel cell stack 20 reduces the amount of water remaining in the fuel cell stack 20 and its connection pipes and the amount of hydrogen remaining in the fuel cell stack 20 and the pipes for hydrogen 51, 61 and 63.

The operation time of the hydrogen pump 64 for this purging is, for example, 5 to 20 [s]. This indicates a relatively long purging time. The purge operation performed at step S220 accordingly has high purging capacity.

When it is determined at step S210 that the winter determination flag F is not equal to the value 1, on the other hand, the CPU performs a purge (step S230) that is similar to the purge performed at step S220. The operation time of the hydrogen pump 64 at step S230 is, however, for example, 1 to 2 [s] and is shorter than the operation time at step S220. Accordingly the purge performed at step S220 has the higher purging capacity than the purging capacity of the purge performed at step S230. The "purging capacity" herein means an integrated amount of the purge gas per purge operation.

This embodiment causes the purge operation of step S220 to have the higher purging capacity than the purge operation of step S230 by increasing the purge time. A modification may increase the displacement of the hydrogen pump 64 with keeping the purge time unchanged, so as to increase the power of purging per unit time and thereby enhance the purging capacity. The configuration of increasing the purge time is allowed to decrease the capacity required for the pump, compared with the configuration of increasing the displacement of the pump to enhance the purging effect. The configuration of increasing the power of purging per unit time, on the other hand, allows purging to be completed in a short time period.

Another modification may employ a different operation for the purge of step S230 from that employed for the purge of step S220. This different operation may be, for example, a process of simply opening and closing once the drainage valve 66 provided in the hydrogen gas supply discharge system 50 (shown in FIG. 1). In this state, the hydrogen pump 64 is not operated, but the drainage valve 66 is opened and closed to release the anode off-gas from the anode off-gas pipe 61 and perform a purge with a little flow of the purge gas. The purge performed at the winter determination flag F that is not equal to the value 1 accordingly has the relatively low purging capacity than the purge performed at the winter determination flag F that is equal to the value 1.

After step S220 or step S230, the CPU terminates this stop-time purge process routine.

Figure 4:
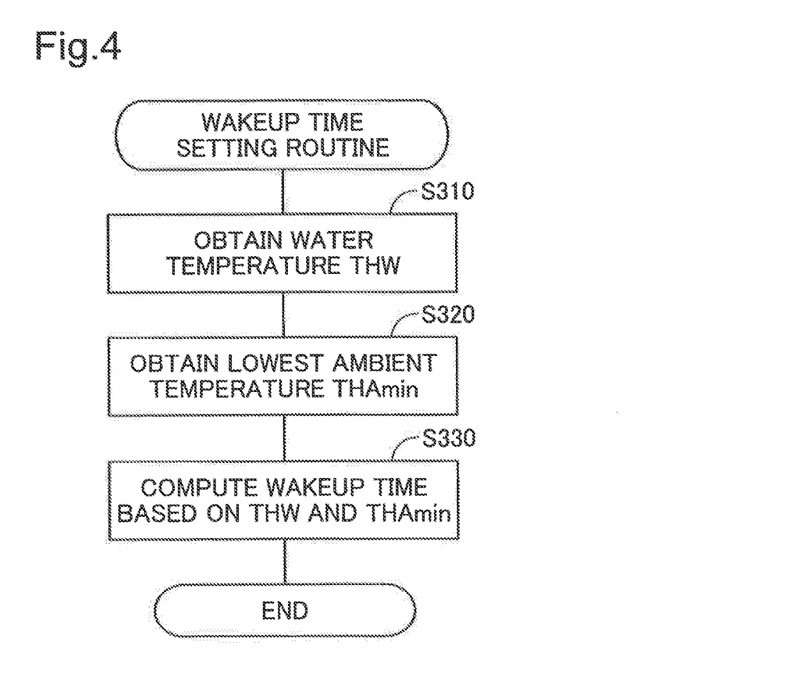
FIG. 4 is a flowchart showing a wakeup time setting routine performed by the controller.

FIG. 4 is a flowchart showing a wakeup time setting routine performed by the controller 10. As described above, the purge operation performed this embodiment includes the parking purge that is performed when the predetermined wakeup time has elapsed since an off operation of the ignition switch 90, in addition to the stop-time purge. The wakeup time setting routine is performed to set this wakeup time and is performed by the CPU of the controller 10 when the ignition switch 90 is turned off, like the stop-time purge process routine.

When the wakeup time setting routine is triggered, the CPU first obtains a water temperature THW from the first temperature measurement unit 76a (step S310). The CPU subsequently obtains a lowest ambient temperature THAmin (step S320). The lowest ambient temperature THAmin is determined based on the detection value of the ambient temperature sensor 80 by a separate routine and denotes a minimum value of ambient temperature when the fuel cell system 100 was operated last time. More specifically, at step S320, the CPU obtains a minimum value of the ambient temperature THA detected by the ambient temperature sensor 80 in the driving state and in the non-driving state of the vehicle for a time period between a previous on operation to a subsequent off operation of the ignition switch 90, as the lowest ambient temperature THAmin. In other words, step S310, the CPU specifies the lower temperature between the ambient temperature THA detected by the ambient temperature sensor 80 in the driving state and the ambient temperature THA detected by the ambient temperature sensor 80 in the non-driving state, as the lowest ambient temperature THAmin. In the specification, "the driving state" of the vehicle means the state where the velocity of the vehicle is not zero, and "the non-driving state" of the vehicle means the state where the velocity of the vehicle is zero.

The CPU subsequently computes a wakeup time, based on the obtained water temperature THW and the obtained lowest ambient temperature THAmin (step S330). The wakeup time denotes a time period until the fuel cell system 100 is likely to be frozen since an off operation of the ignition switch 90. More specifically, at step S330, the CPU computes a time period until the fuel cell system 100 is likely to be frozen, based on the water temperature THW in the off state of the ignition switch 90 obtained at step S310 and the minimum value of the ambient temperature THA detected by the ambient temperature sensor 80 in the driving state and in the non-driving state of the vehicle for a time period between a previous on operation to a subsequent off operation of the ignition switch 90, and sets the computed time period as the wakeup time. The lower the minimum value of the ambient temperature THA is, the shorter the wakeup time is set. The lower water temperature THW is, the shorter the wakeup time is set for identical values of the minimum value of the ambient temperature THA. After the computation at step S330, the CPU terminates the wakeup time setting routine.

Figure 5:
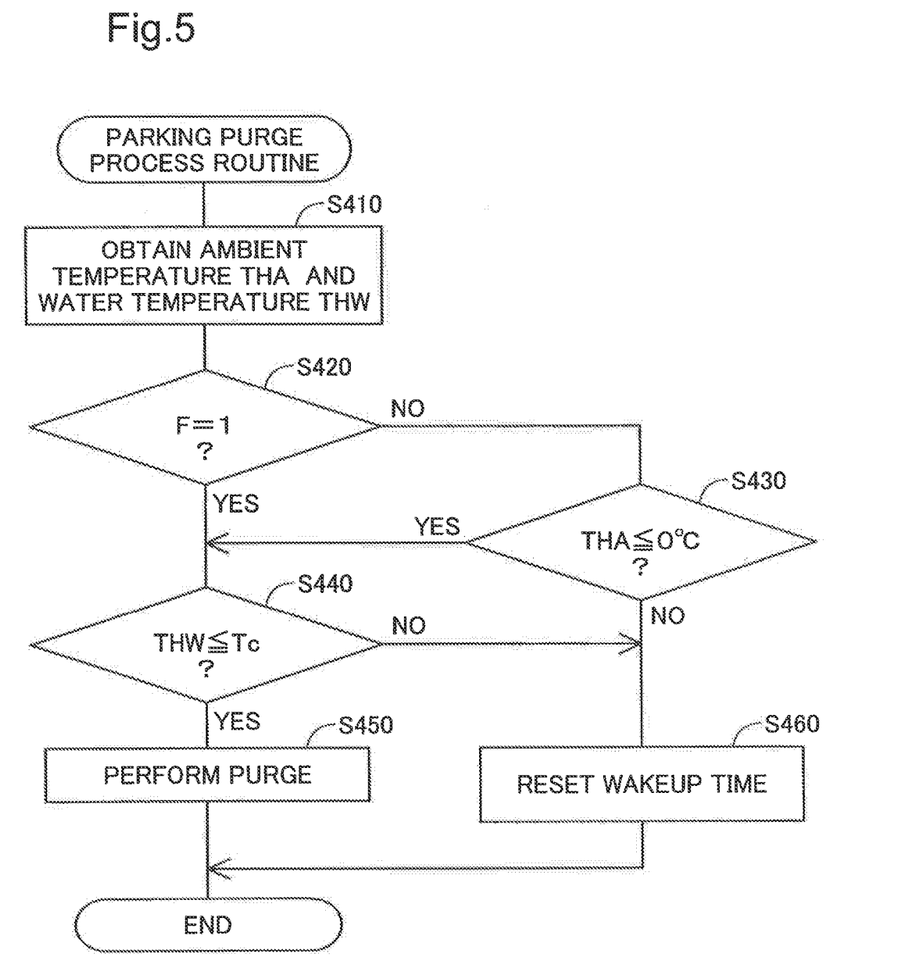
FIG. 5 is a flowchart showing a parking purge process routine performed by the controller.

FIG. 5 is a flowchart showing a parking purge process routine performed by the controller 10. The parking purge process routine is performed by the CPU of the controller 10 when the wakeup time has elapsed since an off operation of the ignition switch 90. The wakeup time is set by the wakeup time setting routine.

When the parking purge process routine is triggered, the CPU first obtains the ambient temperature THA from the ambient temperature sensor 80 and obtains the water temperature THW from the first temperature measurement unit 76a (step S410). The CPU subsequently determines whether the winter determination flag F set by the winter determination process routine is equal to the value 1. (step S420). When it is determined that the winter determination flag F is equal to the value 1, the CPU directly proceeds to step S440. When it is determined that the winter determination flag F is not equal to the value 1, on the other hand, the CPU determines whether the ambient temperature THA obtained at step S410 is equal to or lower than 0° C. (step S430). The CPU proceeds to step S440 only when the obtained ambient temperature THA is equal to or lower than 0° C.

On other words, the processing of steps S420 and S430 causes the CPU not to proceed to step S440 until the ambient temperature THA decreases to or below 0° C., when the winter determination flag F is not equal to the value 1. When the winter determination flag F is equal to the value 1, on the other hand, the CPU proceeds to step S440, irrespective of the ambient temperature THA. The case where the winter determination flag F is equal to the value 1 does not need the determination with regard to the ambient temperature THA at step S430 and accordingly has the higher possibility to shift to step S440, compared with the case where the winter determination flag F is not equal to the value 1.

At step S440, the CPU determines whether the water temperature THW obtained at step S410 is equal to or lower than a predetermined value Tc. The predetermined value Tc denotes a temperature of higher than 0° C. and is, for example, 5° C. according to this embodiment. Setting the temperature of higher than 0° C. to the predetermined value Tc allows a measure to be taken prior to freezing. The predetermined value Tc may be any temperature that; is higher than 0° C. and not higher than 10° C. When it is determined at step S440 that the water temperature THW is equal to or lower than the predetermined value Tc, the CPU performs a purge (step S450). The purge performed at step S450 is the same as the purge performed at step S220 in the step-time purge process routine (shown in FIG. 3). Accordingly the purge having the high purging capacity is performed. The purging capacity of the purge performed at step S450 may, however, not be necessarily equal to the purging capacity of the purge performed at step S220 but may be a different purging capacity.

When it is determined at step S440 that the water temperature THW is higher than the predetermined value Tc or when it is determined at step S430 that the ambient temperature THA is higher than 0° C., on the other hand, the CPU does not perform a purge but resets the wakeup time (step S460). This process of resetting the wakeup time computes the wakeup time based on the water temperature THW and the lowest ambient temperature THAmin, like the wakeup time setting routine of FIG. 4. The water temperature THW used here is the water temperature THW obtained at step S410. The lowest ambient temperature THAmin used here denotes a minimum value of ambient temperature when the fuel cell system 100 was operated last time, like the wakeup time setting routine.

After performing the purge step S450 or after resetting the wakeup time at step S460, the CPU terminates the parking purge process routine. In the case where the wakeup time is reset, the parking purge process routine is performed against after elapse of the reset wakeup time since the termination of the parking purge process routine.

C. ADVANTAGEOUS EFFECTS OF EMBODIMENT

As described above in detail, on the occasion of a stop-time purge, the fuel cell system 100 of the embodiment obtains the ambient temperature THA in the driving state of the vehicle and performs a purge with setting the winter determination flag F to the value 1 (S150 in FIG. 2) and enhancing the purging capacity (FIG. 3) in the case where the obtained ambient temperature THA in the driving state is equal to or lower than the first reference value Ta (for example, −10° C.) (S140: YES in FIG. 2), compared with the case where the obtained ambient temperature THA in the driving state is higher than the first reference value Ta the case where the winter determination flag F=0). This configuration of the fuel cell system 100 enables a purge to be performed using the ambient temperature THA in the driving state of the vehicle. As described above, the ambient temperature in the driving state of the vehicle is less affected by a disturbance than the ambient temperature at the stop time of the vehicle. The fuel cell system 100 performs a purge with the enhanced purging capacity based on the ambient temperature that is insusceptible to a disturbance and thereby provides the enhanced purging effect.

On the occasion of a parking purge, the fuel cell system 100 increases the likelihood of performing a purge in the case where the ambient temperature THA in the driving state of the vehicle is equal to or lower than the first reference value Ta (for example, −10° C.) (i.e., in the case where the winter determination flag F=1), compared with the case where the ambient temperature THA in the driving state is higher than the first reference value Ta (i.e., the case where the winter determination flag F=0) (FIG. 5). This configuration of the fuel cell system 100 increases the likelihood of performing a purge based on the ambient temperature THA that is insusceptible to a disturbance, thus enabling a purge to be performed at an appropriate timing.

Additionally, the fuel cell system 100 specifies the lower temperature between the ambient temperature THA detected by the ambient temperature sensor 80 in the driving state and the ambient temperature THA detected by the ambient temperature sensor 80 in the non-driving state, as the lowest ambient temperature THAmin, and computes the wakeup time based on the lowest ambient temperature THAmin (FIG. 4). The ambient temperature in the driving state of the vehicle is less affected by a disturbance than the ambient temperature at the stop time of the vehicle, while being likely to be detected as a higher temperature than the ambient temperature detected at the stop time of the vehicle, depending on the time of day. This configuration of the fuel cell system 100 uses the lowest ambient temperature THAmin and accordingly enables the purge to be performed at the more appropriate timing.

The fuel cell system 100 sets the winter determination flag F to the value 1 when the ambient temperature sensor 80 is abnormal (S120: YES and S150 in FIG. 2). This configuration causes a purge to be performed as a precaution and thereby further enhances the purging effect.

D. MODIFICATIONS

Modification 1

In the fuel cell system 100 of the embodiment described above, the hydrogen pump 64 of the hydrogen gas supply discharge system 50 is driven to circulate the remaining gas on the anode side that remains inside of the fuel cell system 100, as the purge gas. The purge operation may, however, use another purge gas to flowed into the fuel cell stack 20 and its connection pipes. For example, the air compressor 32 of the air supply discharge system 30 may be driven to flow the outside air as the purge as into the fuel cell stack 20. The fuel cell system 100 may be equipped with a supply source that is configured to supply an inert gas as the purge gas tip the fuel cell stack 20.

Modification 2

The fuel cell system 100 of the embodiment performs both the stop-time purge and the parking purge. According to a modification, the fuel cell system may perform either one of the stop-time purge and the parking purge.

Modification 3

In the fuel cell system 100 of the above embodiment, in the case where the winter determination flag F is set to the value 1 in the winter determination process routine of FIG. 2 in the course of operation of the fuel cell stack 20, the operation of the fuel cell stack 20 may be changed to an operation that reduces the water content of the fuel cell, compared with the case where the winter determination flag F is equal to 0 (hereinafter called normal state). Setting the winter determination flag F to the value 1 leads to an expectation of the need for the enhanced purging capacity in a stop-time purge or a parking purge. By taking into account this expectation, the operation of the fuel cell stack 20 is changed to the operation that reduces the water content of the fuel cell. This modification further reduces the amount of water remaining inside of the fuel cell system after purging.

One exemplary operation that reduces the water content of the fuel cell increases the water temperature (the temperature of the cooling medium) of the fuel cell from the temperature in the ordinary state. This increases the temperature of the gas and increases the removal amount of water, thereby decreasing the water content of the fuel cell. Another exemplary operation increases the supply amount of the cathode gas (oxidizing gas) from the supply amount in the ordinary state. This also results in increasing the removal amount of water.

Modification 4

In the above embodiment, the purging time, as the purging capacity; is adjusted under some conditions in the stop-time purge process routine that controls the stop-time purge (See steps S210-S230 in FIG. 2). However, the purging capacity may be adjusted based on the ambient temperature THA and water temperature THW the similar way as the stop-time purge process routine, in the parking purge process routine that controls the parking purge.

Modification 5

In the above embodiment, the routine of FIG. 2 is repeatedly performed and the ambient temperatures are obtained a plurality of times. However, the ambient temperature may be obtained in other manners. For example, the ambient temperature from ambient temperature sensor may be recorded continuously and then one value of ambient temperature at the predetermined timing (e.g. at the timing when the vehicle transits to the non-driving state) may be utilized. The ambient temperature may be obtained in time series regardless of whether it is obtained continuously or discontinuously.

Modification 6

In the above embodiment, it is determined whether the obtained ambient temperature THA is equal to or lower than a first reference value Ta in the step S140 of FIG. 2. However, in the step S140, it may be determined whether the obtained ambient temperature THA is lower than a first reference value Ta, and the process may diverge based on the determination.

It is determined whether the obtained ambient temperature THA is equal to or higher than a second reference value Tb in the step S190. However, in the step S190, it may be determined whether the obtained ambient temperature THA is higher than a second reference value Tb, and the process may diverge based on the determination.

Modification 6

It is determined whether the ambient temperature THA is equal to or lower than 0° C. in the step S430. However, in the step S430, it may be determined whether the ambient temperature THA is lower than 0° C., and the process may diverge based on the determination.

It is determined whether the water temperature THW is equal to or lower than a predetermined value Tb in the step S440. However, in the step S440, it may be determined whether the water temperature THW is lower than a predetermined value Tc, and the process may diverge based on the determination.

The invention is not limited to any of the embodiment and the modifications described above but may be implemented by a diversity of other configurations without departing from the scope of the invention. For example, the technical features of any of the embodiment and the modifications corresponding to the technical features of each of the aspects described in SUMMARY may be replaced or combined appropriately in order to solve part or all of the problems described above or in order to achieve part or all of the advantageous effects described above. Among the components described in any of the embodiment and the modifications described above, the components other than those described in independent claims are additional components and may be omitted as appropriate.

The invention claimed is:

1. A fuel cell system mounted on a vehicle, comprising:
a fuel cell;
an ambient temperature sensor configured to obtain a temperature outside of the vehicle as an ambient temperature;
a gas supplier configured to supply a purge gas into the fuel cell; and
a controller configured to control the gas supplier and perform a purge operation to purge the fuel cell with the purge gas, wherein
the controller obtains an ambient temperature in time series from the ambient temperature sensor when the vehicle is moving,
the controller performs the purge operation after an off operation of a start switch of the vehicle, and
in a case where an ambient temperature obtained last time among only the ambient temperatures obtained in time series when the vehicle is moving is lower than a predetermined reference value, the controller performs the purge operation after the off operation of the start switch with enhancing a purging capacity, compared with a case where the ambient temperature obtained last time is higher than the predetermined reference value.

2. The fuel cell system according to claim 1, wherein the enhancing the purging capacity comprises increasing a purge time.

3. The fuel cell system according to claim 1, wherein the enhancing the purging capacity comprises increasing a power of purging per unit time.

4. The fuel cell system according to claim 1, wherein when the ambient temperature sensor is abnormal, the controller performs the purge with a condition that is similar to a condition in the case where the ambient temperature obtained in the driving state is lower than the predetermined reference value.

5. The fuel cell system according to claim 1, wherein:
the controller reduces a water content of the fuel cell in the case where the ambient temperature obtained in the driving state is lower than the predetermined reference value, compared with the case where the ambient temperature obtained in the driving state is higher than the predetermined reference value.

6. The fuel cell system according to claim 5, wherein the reducing the water content of the fuel cell comprises increasing a temperature of cooling medium for the fuel cell or increasing a supply amount of an oxidizing gas that is to be supplied to the fuel cell.

7. A fuel cell system mounted on a vehicle, comprising:
a fuel cell;
an ambient temperature sensor configured to obtain a temperature outside of the vehicle as an ambient temperature;
a gas supplier configured to supply a purge gas into the fuel cell; and
a controller configured to control the gas supplier and perform a purge operation to purge the fuel cell with the purge gas, wherein
the controller obtains an ambient temperature in time series from the ambient temperature sensor when the vehicle is moving,
the controller performs the purge operation after an off operation of a start switch of the vehicle, and
in a case where an ambient temperature obtained last time among the ambient temperatures obtained in time series is lower than a predetermined reference value, the controller requires fewer predetermined conditions to be satisfied to perform the purge operation after the off operation of the start switch, compared with a case where the ambient temperature obtained last time is higher than the predetermined reference value.

8. The fuel cell system according to claim 7, wherein
the controller obtains an ambient temperature from the ambient temperature sensor in a non-driving state of the vehicle where the vehicle has a zero vehicle speed,
the controller sets a timing when the purge operation is performed, based on a lower temperature between the ambient temperature obtained in the driving state and the ambient temperature obtained in the non-driving state.

9. The fuel cell system according to claim 7,
wherein when the ambient temperature sensor is abnormal, the controller performs the purge with a condition that is similar to a condition in the case where the ambient temperature obtained in the driving state is lower than the predetermined reference value.

10. The fuel cell system according to claim 7, wherein:
the controller reduces a water content of the fuel cell in the case where the ambient temperature obtained in the driving state is lower than the predetermined reference value, compared with the case where the ambient temperature obtained in the driving state is higher than the predetermined reference value.

11. The fuel cell system according to claim 10,
wherein the reducing the water content of the fuel cell comprises increasing a temperature of cooling medium for the fuel cell or increasing a supply amount of an oxidizing gas that is to be supplied to the fuel cell.

* * * * *